(12) United States Patent
Malayath et al.

(10) Patent No.: US 12,401,818 B2
(45) Date of Patent: Aug. 26, 2025

(54) EFFICIENT VIDEO ENCODER ARCHITECTURE

(71) Applicant: QUALCOMM Incorporated, San Diego, CA (US)

(72) Inventors: Narendranath Malayath, San Diego, CA (US); Kai Wang, San Diego, CA (US); Xue Fang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/187,132

(22) Filed: Feb. 26, 2021

(65) Prior Publication Data

US 2022/0279204 A1 Sep. 1, 2022

(51) Int. Cl.
*H04N 19/52* (2014.01)
*H04N 19/547* (2014.01)
*H04N 19/577* (2014.01)
*H04N 19/587* (2014.01)

(52) U.S. Cl.
CPC ........... *H04N 19/52* (2014.11); *H04N 19/547* (2014.11); *H04N 19/587* (2014.11)

(58) Field of Classification Search
CPC ...... H04N 19/52; H04N 19/577; H04N 19/11; H04N 19/547; H04N 19/58
See application file for complete search history.

(56) References Cited

U.S. PATENT DOCUMENTS

| | | | |
|---|---|---|---|
| 6,101,276 A | 8/2000 | Adiletta et al. | |
| 6,728,317 B1* | 4/2004 | Demos | H04N 19/36 348/E7.015 |
| 8,532,192 B2* | 9/2013 | Persson | H04N 19/61 375/240.18 |

(Continued)

FOREIGN PATENT DOCUMENTS

| CN | 101584216 A | 11/2009 |
|---|---|---|
| CN | 107113432 A | 8/2017 |

(Continued)

OTHER PUBLICATIONS

Evaluation of data-parallel slitting approaches for H.264 decoder; Altunbasak—2008 (Year: 2008).*

(Continued)

*Primary Examiner* — Luis Perez-Fuentes
(74) *Attorney, Agent, or Firm* — Polsinelli

(57) ABSTRACT

Systems, methods, and computer-readable media are provided for efficient video coding. An method can include determining, during a first coding stage implemented at a first frame rate, first motion vectors for a first subset of frames in a sequence of frames; determining, during a second coding stage, second motion vectors for a second subset of frames in the sequence of frames, wherein a portion of the second motion vectors is calculated based on one or more of the first motion vectors; and reconstruct, during the second coding stage, the first subset of frames using the first motion vectors; and reconstruct, during the second video coding stage, the second subset of frames (Continued)

using the second motion vectors, the first coding stage and the second coding stage being implemented in parallel, and the second coding stage being implemented at a second frame rate that is higher than the first frame rate.

32 Claims, 9 Drawing Sheets

(56) References Cited

U.S. PATENT DOCUMENTS

| | | | | |
|---|---|---|---|---|
| 11,765,378 | B2* | 9/2023 | Chen | H04N 19/52 |
| | | | | 375/240.16 |
| 2003/0156641 | A1* | 8/2003 | Sohn | H04N 5/145 |
| | | | | 348/E7.013 |
| 2004/0131122 | A1* | 7/2004 | Kudo | H04N 19/436 |
| | | | | 375/E7.103 |
| 2004/0218816 | A1* | 11/2004 | Hannuksela | H04N 19/42 |
| | | | | 382/232 |
| 2005/0105619 | A1* | 5/2005 | Lee | H04N 19/159 |
| | | | | 375/E7.176 |
| 2005/0175091 | A1* | 8/2005 | Puri | H04N 19/149 |
| | | | | 375/E7.138 |
| 2005/0226334 | A1* | 10/2005 | Han | H04N 19/523 |
| | | | | 375/E7.125 |
| 2006/0088101 | A1* | 4/2006 | Han | H04N 19/31 |
| | | | | 375/240.16 |
| 2007/0201562 | A1 | 8/2007 | Ganesh et al. | |
| 2012/0230392 | A1* | 9/2012 | Zheng | H04N 19/196 |
| | | | | 375/E7.256 |
| 2014/0247878 | A1* | 9/2014 | Xu | H04N 19/36 |
| | | | | 375/240.16 |
| 2015/0341646 | A1* | 11/2015 | Sze | H04N 21/631 |
| | | | | 375/240.26 |
| 2016/0182911 | A1* | 6/2016 | Su | H04N 19/587 |
| | | | | 375/240.02 |
| 2017/0111653 | A1* | 4/2017 | Maeda | H04N 19/30 |
| 2019/0281270 | A1* | 9/2019 | Chen | H04N 19/70 |
| 2019/0356926 | A1* | 11/2019 | Tsukagoshi | H04N 19/51 |
| 2020/0304809 | A1* | 9/2020 | Komiya | H04N 19/137 |
| 2021/0092432 | A1* | 3/2021 | Rusanovskyy | H04N 19/56 |

FOREIGN PATENT DOCUMENTS

| | | | |
|---|---|---|---|
| CN | 111194547 A | 5/2020 | |
| EP | 1455534 A1 | 9/2004 | |
| EP | 1574995 A1 * | 9/2005 | H04N 19/112 |
| WO | 03036942 A1 | 5/2003 | |

OTHER PUBLICATIONS

Efficient Mixed Parallel-Pipeline SAD Architecture for HEVC Motion Estimation—2021 (Year: 2021).*
International Search Report and Written Opinion—PCT/US2022/015702—ISA/EPO—May 25, 2022.
Lee G.G., et al., "Bi-Directional Trajectory Tracking With Variable Block-Size Motion Estimation for Frame Rate Up-Convertor", IEEE Journal on Emerging and Selected Topics in Circuits and Systems, IEEE, Piscataway, NJ, USA, vol. 4, No. 1, Mar. 1, 2014, pp. 29-42, XP011542402, ISSN: 2156-3357, DOI: 10.11 09/JETCAS. 2014.2298923 [retrieved on Mar. 7, 2014].
Taiwan Search Report—TW111104744—TIPO—Mar. 12, 2025.

* cited by examiner

500

DETERMINE, DURING A FIRST VIDEO CODING STAGE IMPLEMENTED AT A FIRST FRAME RATE, FIRST MOTION VECTORS FOR A FIRST SUBSET OF FRAMES IN A SEQUENCE OF FRAMES
502

DETERMINE, DURING A SECOND VIDEO CODING STAGE IMPLEMENTED AT A SECOND FRAME RATE THAT IS HIGHER THAN THE FIRST FRAME RATE, SECOND MOTION VECTORS FOR A SECOND SUBSET OF FRAMES IN THE SEQUENCE OF FRAMES, WHEREIN AT LEAST A PORTION OF THE SECOND MOTION VECTORS IS CALCULATED BASED ON ONE OR MORE MOTION VECTORS FROM THE FIRST MOTION VECTORS
504

RECONSTRUCT, DURING THE SECOND VIDEO CODING STAGE, THE FIRST SUBSET OF FRAMES USING THE FIRST MOTION VECTORS
506

RECONSTRUCT, DURING THE SECOND VIDEO CODING STAGE, THE SECOND SUBSET OF FRAMES USING THE SECOND MOTION VECTORS, WHEREIN THE FIRST VIDEO CODING STAGE AND THE SECOND VIDEO CODING STAGE ARE IMPLEMENTED AT LEAST PARTLY IN PARALLEL
508

FIG. 5

EFFICIENT VIDEO ENCODER ARCHITECTURE

TECHNICAL FIELD

The present disclosure is generally related to video coding and compression and, more specifically, to efficient video coding architectures.

BACKGROUND

Many devices and systems allow video data to be processed and output for consumption. Digital video data includes increasingly large amounts of data to meet the video quality and other demands of video consumers and providers. For example, consumers of video data typically desire high quality videos, with high fidelity, resolutions, frame rates, and the like. As a result, the large amount of video data often needed to meet these demands places a significant burden on communication networks and devices that process and store the video data.

Various video coding techniques may be used to compress video data and reduce the burden on communication networks. Video coding can be performed according to specific coding standards. Some example video coding standards include Essential Video Coding (EVC), high-efficiency video coding (HEVC), advanced video coding (AVC), MPEG-2 Part 2 coding (MPEG stands for moving picture experts group), VP9, Alliance of Open Media (AOMedia) Video 1 (AV1), or the like. Video coding generally utilizes motion estimation and prediction methods (e.g., inter-prediction, intra-prediction, or the like) that take advantage of redundancy present in video images or sequences. One example goal of video coding techniques is to compress video data into a form that uses a lower bit rate, while avoiding or minimizing degradations in video quality. While such video compression can provide various benefits, such as a reducing the burden of video data on communication networks, the video coding techniques implemented can be computationally expensive, which can result in higher hardware costs and performance sacrifices. With ever-evolving video services becoming available, coding techniques with better coding efficiency and performance are needed.

BRIEF SUMMARY

Disclosed are systems, methods, and computer-readable media for efficient video coding and encoder architectures. According to at least one example, a method is provided for efficient video coding. The method can include determining, during a first video coding stage implemented at a first frame rate, first motion vectors for a first subset of frames in a sequence of frames; determining, during a second video coding stage implemented at a second frame rate that is higher than the first frame rate, second motion vectors for a second subset of frames in the sequence of frames, wherein at least a portion of the second motion vectors is calculated based on one or more motion vectors from the first motion vectors; reconstructing, during the second video coding stage, the first subset of frames using the first motion vectors; and reconstructing, during the second video coding stage, the second subset of frames using the second motion vectors, wherein the first video coding stage and the second video coding stage are implemented at least partly in parallel.

According to at least one example, an apparatus is provided for efficient video coding. In some examples, the apparatus can include memory and one or more processors coupled to the memory, the one or more processors being configured to determine, during a first video coding stage implemented at a first frame rate, first motion vectors for a first subset of frames in a sequence of frames; determine, during a second video coding stage implemented at a second frame rate that is higher than the first frame rate, second motion vectors for a second subset of frames in the sequence of frames, wherein at least a portion of the second motion vectors is calculated based on one or more motion vectors from the first motion vectors; reconstruct, during the second video coding stage, the first subset of frames using the first motion vectors; and reconstruct, during the second video coding stage, the second subset of frames using the second motion vectors, wherein the first video coding stage and the second video coding stage are implemented at least partly in parallel.

According to at least one example, a non-transitory computer-readable medium is provided for efficient video coding. The non-transitory computer-readable medium can include instructions stored thereon which, when executed by one or more processors, cause the one or more processors to determine, during a first video coding stage implemented at a first frame rate, first motion vectors for a first subset of frames in a sequence of frames; determine, during a second video coding stage implemented at a second frame rate that is higher than the first frame rate, second motion vectors for a second subset of frames in the sequence of frames, wherein at least a portion of the second motion vectors is calculated based on one or more motion vectors from the first motion vectors; reconstruct, during the second video coding stage, the first subset of frames using the first motion vectors; and reconstruct, during the second video coding stage, the second subset of frames using the second motion vectors, wherein the first video coding stage and the second video coding stage are implemented at least partly in parallel.

According to at least one example, another apparatus is provided for efficient video coding. The apparatus can include means for determining, during a first video coding stage implemented at a first frame rate, first motion vectors for a first subset of frames in a sequence of frames; determining, during a second video coding stage implemented at a second frame rate that is higher than the first frame rate, second motion vectors for a second subset of frames in the sequence of frames, wherein at least a portion of the second motion vectors is calculated based on one or more motion vectors from the first motion vectors; reconstructing, during the second video coding stage, the first subset of frames using the first motion vectors; and reconstructing, during the second video coding stage, the second subset of frames using the second motion vectors, wherein the first video coding stage and the second video coding stage are implemented at least partly in parallel.

In some aspects, the method, non-transitory computer-readable medium, and apparatuses described above can include: at each interval associated with the first frame rate, determining a motion vector of a frame from the first subset of frames, determining respective motion vectors of a number of different frames from the second subset of frames, and reconstructing the number of different frames from the second subset of frames. In some cases, the motion vector of the frame can include at least one of the first motion vectors and the number of different frames can be based on the second frame rate associated with the second video coding stage.

In some examples, each motion vector from at least the portion of the second motion vectors is calculated based on a separate motion vector of a selected frame from the first subset of frames and a temporal distance between the selected frame and a particular frame associated with each motion vector.

In some examples, estimating the first motion vectors can include: for a frame in the first subset of frames, comparing one or more blocks of the frame with a plurality of blocks in a reference frame from the sequence of frames; determining a predictive block from the plurality of blocks based on respective pixel differences between the one or more blocks of the frame and each of the plurality of blocks in the reference frame; and comparing a first position of the one or more blocks of the frame with a second position of the predictive block associated with the reference frame.

In some cases, one or more motion vectors of the second motion vectors are calculated based on one or more additional motion vectors of the second motion vectors, and a temporal distance between one or more frames associated with the one or more motion vectors and one or more reference frames associated with the one or more additional motion vectors.

In some aspects, the method, non-transitory computer-readable medium, and apparatuses described above can include determining a coding pattern for reconstructing the first subset of frames and the second subset of frames, the coding pattern defining an order for reconstructing frames and a respective reference frame for determining each of the first motion vectors and each of the second motion vectors; and reconstructing the first subset of frames and the second subset of frames according to the coding pattern. In some examples, the coding pattern can be based on frame dependencies and/or a temporal distance between each frame in the sequence of frames. In some cases, the frame dependencies can include a requirement that, for each frame in the sequence of frames, a reference frame used to reconstruct each frame has completed being reconstructed.

In some examples, reconstructing the first subset of frames and the second subset of frames includes applying to the first subset of frames and the second subset of frames at least one of motion compensation, one or more transforms and coefficient quantizations, and one or more deblocking filters.

In some examples, the first video coding stage and the second video coding stage are implemented via a dedicated hardware processing pipe. In some examples, the dedicated hardware processing pipe can include one or more processors. In some aspects, the method, non-transitory computer-readable medium, and apparatuses described above can include separately implementing, via one or more additional dedicated hardware processing pipes, the first video coding stage and the second video coding stage to one or more respective sequences of frames.

In some examples, the first motion vectors are determined using a motion estimation algorithm and the second motion vectors are determined using an interpolation algorithm. In some cases, the motion estimation algorithm can be different than the interpolation algorithm.

In some aspects, the method, non-transitory computer-readable medium, and apparatuses described above can include generating an encoded video bitstream. In some examples, the encoded video bitstream can include the sequence of frames. In some aspects, the method, non-transitory computer-readable medium, and apparatuses described above can include transmitting the encoded video bitstream.

In some cases, the second subset of frames includes more frames than the first subset of frames. In some examples, the first subset of frames and the second subset of frames are reconstructed at the second frame rate.

In some aspects, each apparatus described above is or includes a camera, a mobile device (e.g., a mobile telephone or so-called "smart phone" or other mobile device), a smart wearable device, an extended reality device (e.g., a virtual reality (VR) device, an augmented reality (AR) device, or a mixed reality (MR) device), a personal computer, a laptop computer, a server computer, an autonomous vehicle, an encoder, a decoder, or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 5 is a flowchart illustrating an example process for efficient video coding, in accordance with some examples of the disclosure;

DETAILED DESCRIPTION

Figure 1:
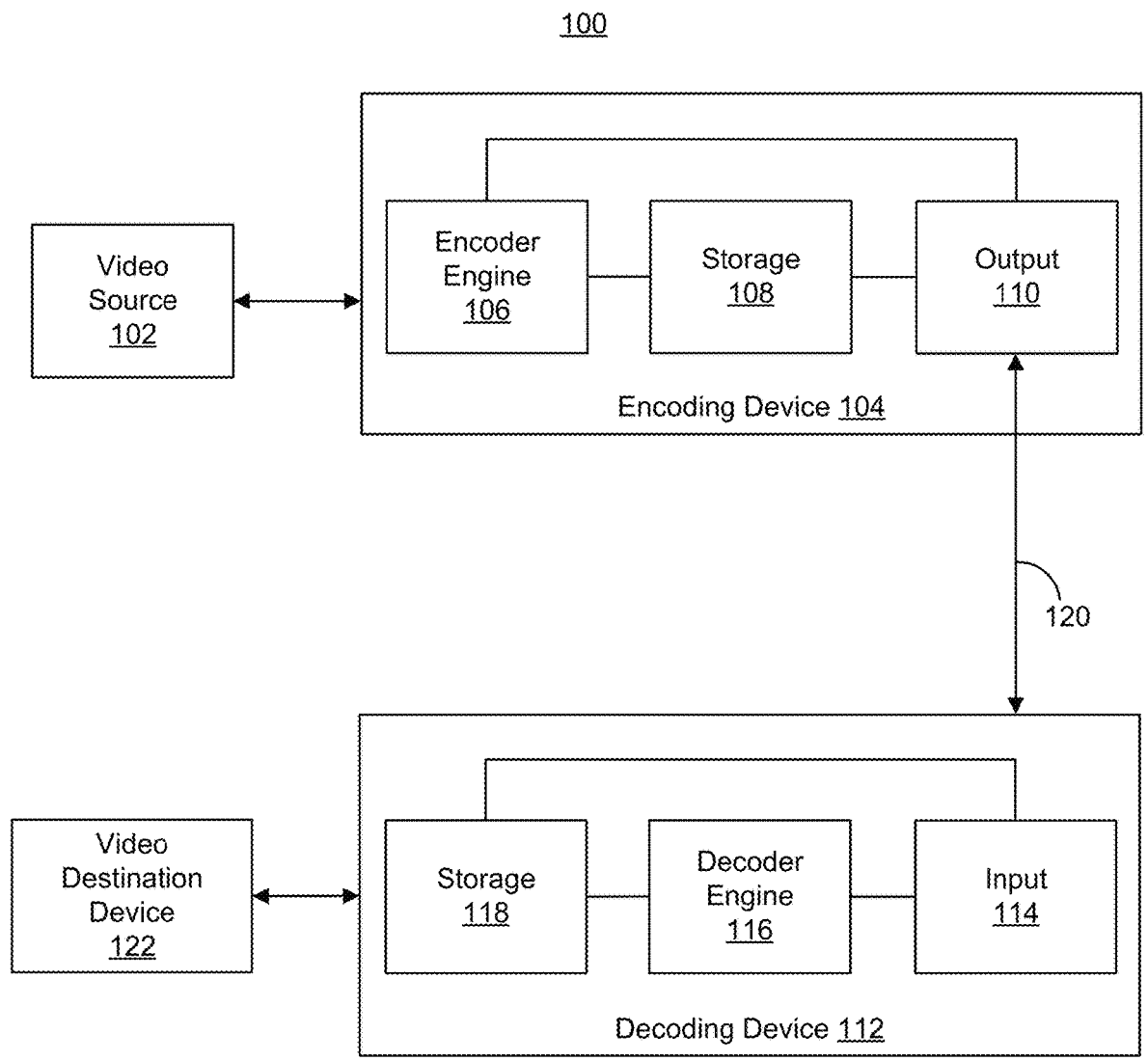
FIG. 1 is a block diagram illustrating an example of an encoding device and a decoding device, in accordance with some examples of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Systems, apparatuses, methods (also referred to as processes), and computer-readable media are described herein for efficient video coding and coding architectures. The technologies described herein can be used to implement an efficient video coder architecture, as described in greater detail below. In some examples, the technologies described herein can provide a scalable and hardware efficient architecture for video encoders. The video encoder architecture can increase silicon area efficiency with high quality and efficient video coding results. In some cases, an example video encoder architecture can divide a video encoding pipeline into stages. The stages can include a stage that performs more computationally expensive operations, such as motion estimation, on a limited number of frames, and another stage that uses the results from the more computationally expensive operations and performs additional operations in the video encoding pipeline. The additional operations can include less computationally expensive operations. The stage that implements the less computationally expensive operations can process a higher number of frames than the stage that implements more computationally expensive operations, and can use the results from the more computationally expensive operations for at least some of the less computationally expensive operations.

In some examples, the example video encoding architecture can implement the different stages of the video encoding pipeline at least partially in parallel, with one stage performing more computationally expensive operations on a smaller number of frames and another stage performing less computationally expensive operations on a larger number of frames. The stage performing the less computationally expensive operations on the larger number of frames can use the results from the more computationally expensive operations, allowing the larger number of frames to be accurately and efficiently coded using a smaller number of the more computationally expensive operations. For example, in some cases, to code a set of frames in a video, a first stage can perform motion estimation on a subset of the frames, and a second stage can perform additional coding operations on the full set of frames. The additional coding operations can include motion compensation. The second stage can use the motion estimation information from the subset of frames for the motion compensation. The second stage can also perform less computationally expensive operations to obtain motion information for the frames that were not processed in the first stage and do not have motion estimation information.

For example, the second stage can predict or interpolate motion information for the frames that were not processed in the first stage. In some examples, the second stage can use reference frames and/or the motion estimation information from the first stage to predict the motion information for the frames that were not processed in the first stage. The motion information prediction or interpolation operations can be less computationally expensive than the motion estimation operations in the first stage. The second stage can use the motion estimation information from the first stage and the predicted motion information from the second stage to perform motion compensation for the full set of frames. The second stage can use the motion compensation results to perform other operations for coding the set of frames. In the above example, the terms "first" and "second" in first stage and second stage are not used to identify or suggest a specific sequence or temporal relationship between the stages, but rather to distinguish the first stage and the second stage when discussing the stages.

The techniques described herein can be applied to any video coding techniques. For example, the techniques described herein can be applied to one or more of a variety of block-based video coding techniques in which video is reconstructed on a block-by-block basis. The techniques described herein can be used with any existing video codecs (e.g., High Efficiency Video Coding (HEVC), Advanced Video Coding (AVC), or other suitable existing video codec), and/or any video coding standards being developed and/or future video coding standards, such as, for example, Essential Video Coding (EVC), Versatile Video Coding (VVC), the joint exploration model (JEM), VP9, AV1, and/or other video coding standard in development or to be developed.

Figure 6:
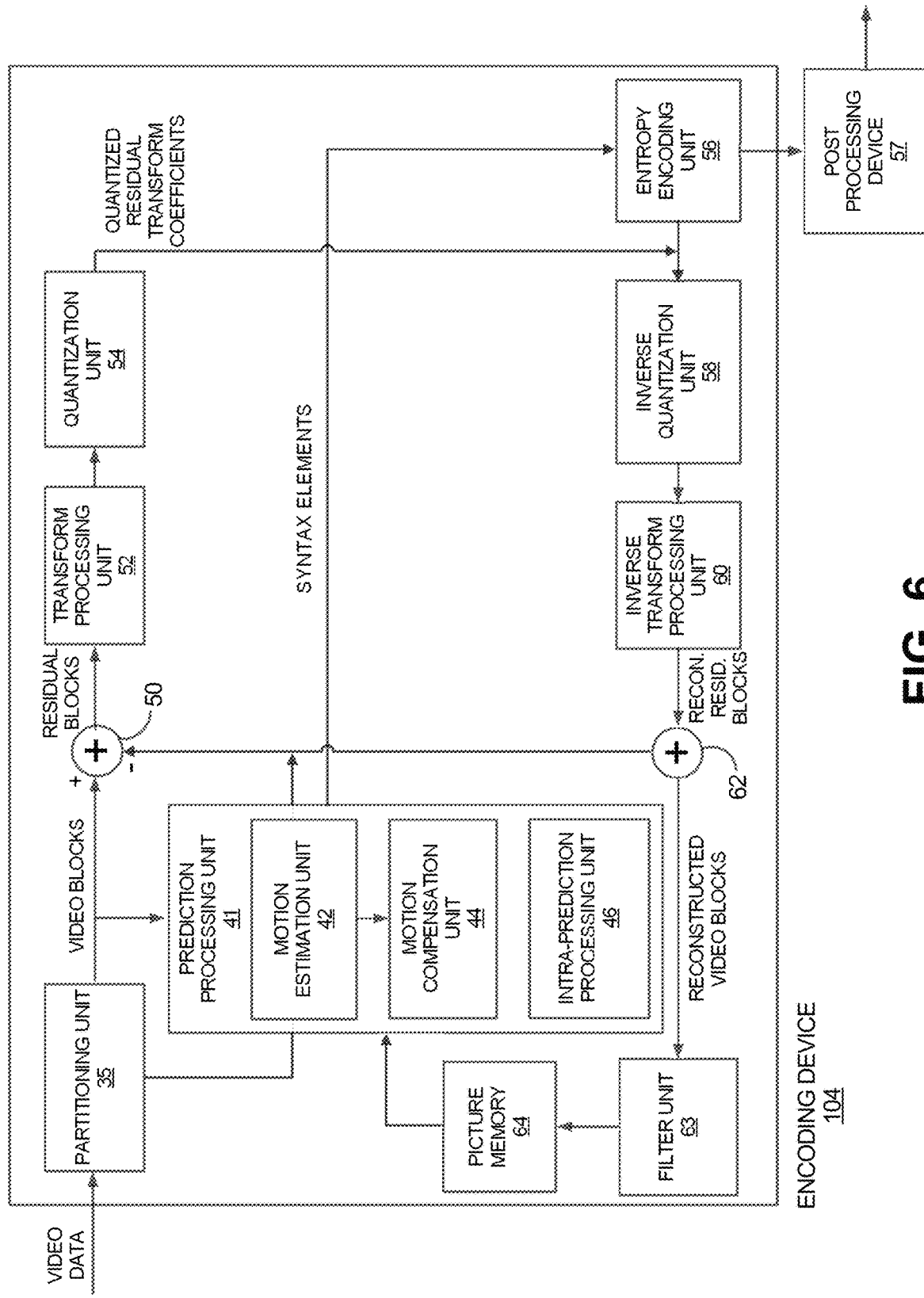
FIG. 6 is a block diagram illustrating an example encoding device, in accordance with some examples of the disclosure.
Figure 7:
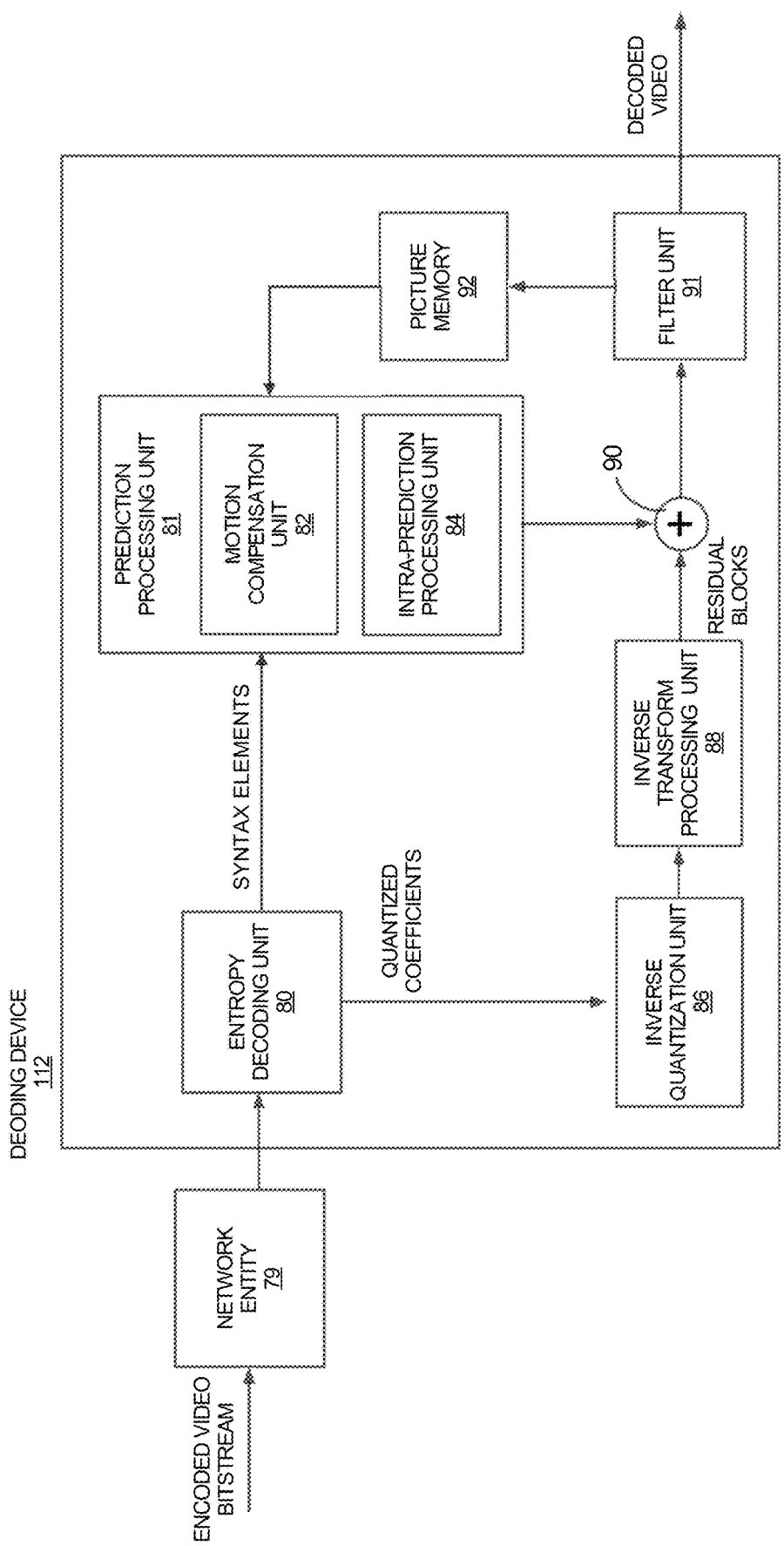
FIG. 7 is a block diagram illustrating an example video decoding device, in accordance with some examples of the disclosure.

The present technologies will be described in the following disclosure as follows. The discussion begins with a description of example systems, architectures, and technologies for efficient video coding, as illustrated in FIG. 1 through FIG. 4. A description of an example method for efficient video coding, as illustrated in FIG. 5, will then follow. The discussion concludes with a description of an example encoding device architecture and an example decoding device architecture, as illustrated in FIGS. 6 and 7. The disclosure now turns to FIG. 1.

FIG. 1 is a block diagram illustrating an example system 100 including an encoding device 104 and a decoding device 112. The encoding device 104 and the decoding device 112 can be part of a same device or separate devices. In some examples, the encoding device 104 may be part of a source device, and the decoding device 112 may be part of a receiving device (also referred to as a client device). The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, extended reality (e.g., virtual reality, augmented reality, and the like), and/or video telephony, among others.

The encoding device 104 (or encoder) can implement the efficient video encoder pipelines and architectures described in more detail below. In some examples, the encoding device 104 can encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multilayer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). Essential Video Coding (EVC), VP9 and Alliance of Open Media (AOMedia) Video 1 (AV1) are other video coding standards for which the techniques described herein can be applied.

Many embodiments described herein can be performed using video codecs such as EVC, VTM, VVC, HEVC, AVC, and/or extensions thereof. However, the techniques and systems described herein may also be applicable to other coding standards or protocols, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS.

An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU)

represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture can be indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) can be used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may include pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may include pixel data in the spatial domain (or pixel domain). As previously noted, the residual data may correspond to pixel difference values between pixels of the unencoded picture and prediction values corresponding to the PUs. The encoder engine 106 may form one or more TUs including the residual data for a CU (which includes the PUs), and may then transform the TUs to produce transform coefficients for the CU. The TUs may include coefficients in the transform domain following application of a block transform.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include one or more buffers, such as a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, for each block, a set of motion information (also referred to herein as motion parameters) can be available. A set of motion information can contain motion information for forward and/or backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of a reference picture set as in HEVC, and/or motion vector scaling, among other things.

In H.264/AVC, each inter-macroblock (MB) may be partitioned into four different ways, including: one 16×16 macroblock partition; two 16×8 macroblock partitions; two 8×16 macroblock partitions; and four 8×8 macroblock partitions, among others. Different macroblock partitions in one macroblock may have different reference index values for each prediction direction (e.g., different reference index values for RefPicList0 and RefPicList1).

In some cases, when a macroblock is not partitioned into four 8×8 macroblock partitions, the macroblock can have only one motion vector for each macroblock partition in each prediction direction. In some cases, when a macroblock is partitioned into four 8×8 macroblock partitions, each 8×8 macroblock partition can be further partitioned into sub-blocks, each of which can have a different motion vector in each prediction direction. An 8×8 macroblock partition can be divided into sub-blocks in different ways, including: one 8×8 sub-block; two 8×4 sub-blocks; two 4×8 sub-blocks; and four 4×4 sub-blocks, among others. Each sub-block can have a different motion vector in each prediction direction. Therefore, a motion vector can be present in a level equal to or higher than a sub-block.

In HEVC, the largest coding unit in a slice is called a coding tree block (CTB) or coding tree unit (CTU). A CTB contains a quad-tree, the nodes of which are coding units. The size of a CTB can range from 16×16 pixels to 64×64 pixels in the HEVC main profile. In some cases, 8×8 pixel CTB sizes can be supported. A CTB may be recursively split into coding units (CU) in a quad-tree manner. A CU could be the same size as a CTB and as small as 8×8 pixels. In some cases, each coding unit is coded with one mode, such as either intra-prediction mode or inter-prediction mode. When a CU is inter-coded using an inter-prediction mode, the CU may be further partitioned into two or four prediction units (PUs), or may be treated as one PU when further partitioning does not apply. When two PUs are present in one CU, the two PUs can be half size rectangles or two rectangles that are ¼ or ¾ the size of the CU.

When the CU is inter-coded, one set of motion information can be present for each PU, which can be derived with a unique inter-prediction mode. For example, each PU can be coded with one inter-prediction mode to derive the set of motion information. In some cases, when a CU is intra-coded using intra-prediction mode, the PU shapes can be 2N×2N and N×N. Within each PU, a single intra-prediction mode is coded (while chroma prediction mode is signalled at the CU level). In some cases, the N×N intra PU shapes are allowed when the current CU size is equal to the smallest CU size defined in SPS.

For motion prediction in HEVC, there are two inter-prediction modes for a prediction unit (PU), including merge mode and advanced motion vector prediction (AMVP) mode. Skip is considered as a special case of merge. In either AMVP mode or merge mode, a motion vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

A merge candidate may correspond to a full set of motion information, while an AMVP candidate may contain one motion vector for a specific prediction direction and a reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction.

The candidates for both modes can be derived from spatial and/or temporal neighboring blocks. Spatial MV candidates are derived from the neighboring blocks for a specific PU (PU0), although the methods generating the candidates from the blocks differ for merge and AMVP modes. In merge mode, the encoder can form a merging candidate list by considering merging candidates from various motion data positions.

Figure 2A:
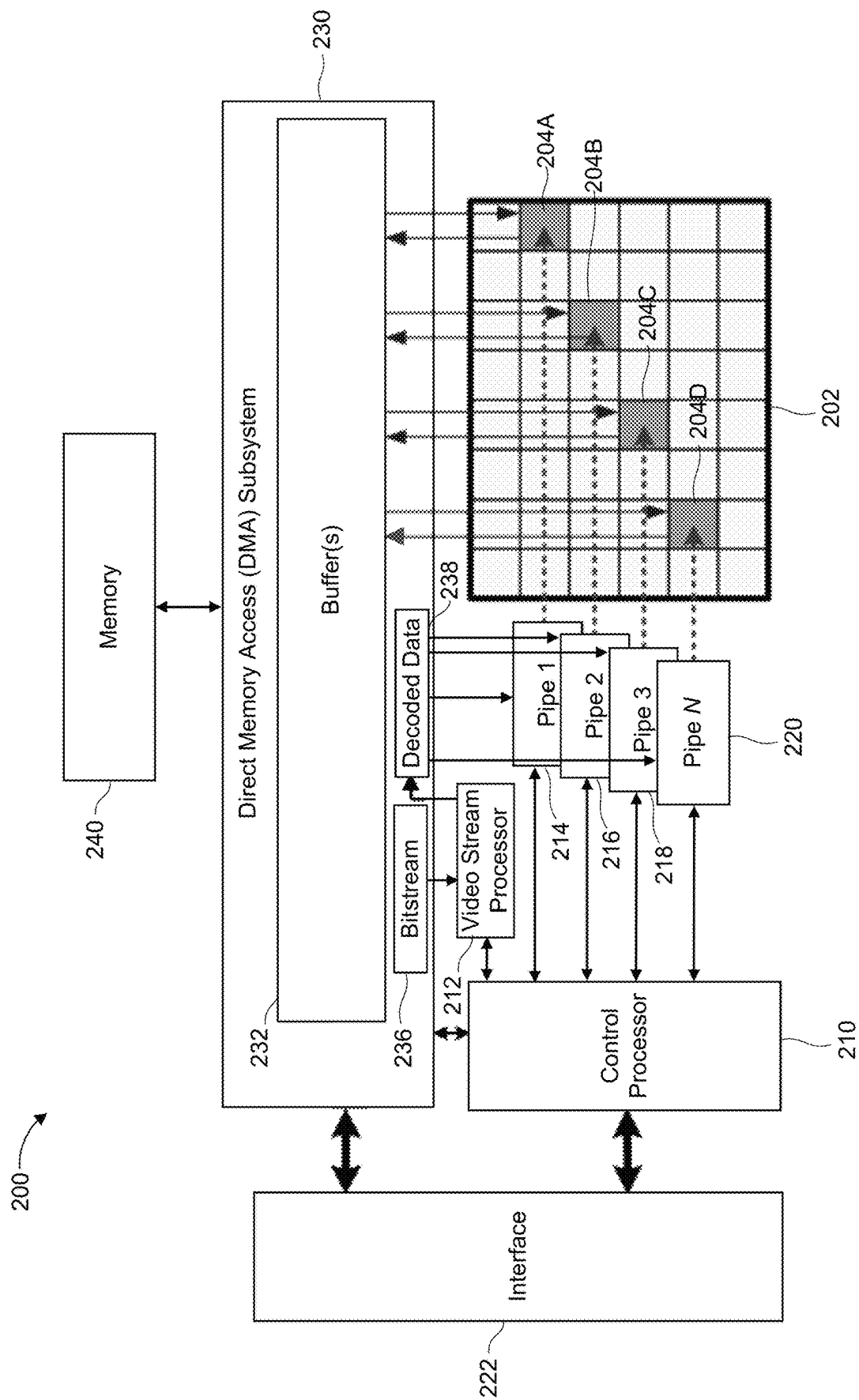
FIG. 2A and 2B are block diagrams illustrating example architectures of a video encoding hardware engine, in accordance with some examples of the disclosure.
Figure 2B:
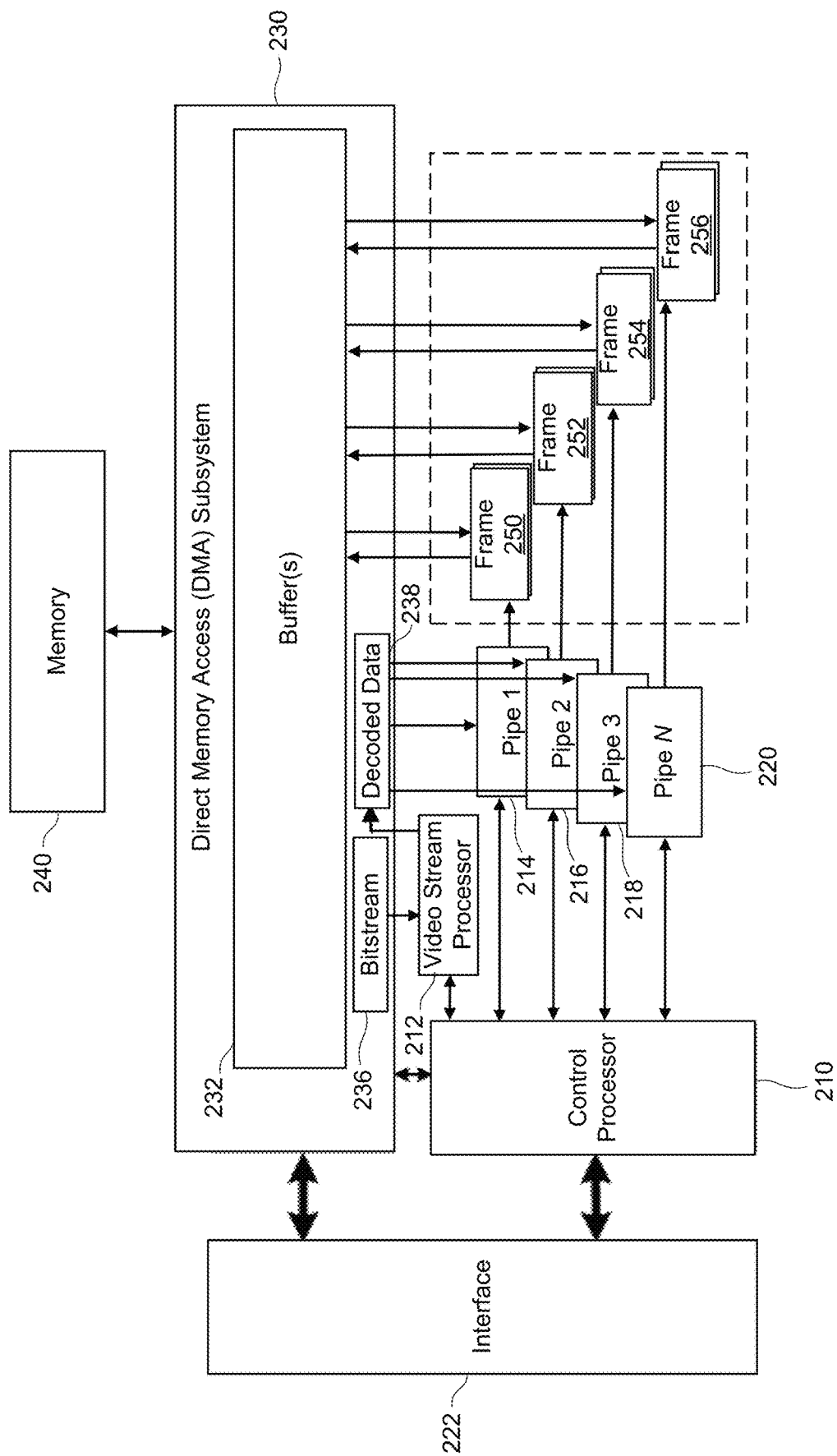

In some cases, the video coder hardware can include multiple subsystems and processing pipes, as shown in FIGS. 2A and 2B. In some examples, the processing pipes can various video processing operations, such as motion estimation, motion compensation, transform and quantization, etc. In some cases, the processing pipes can perform processing operations in parallel.

FIG. 2A is a block diagram illustrating an example architecture 200 of a video encoding hardware engine. In some cases, the architecture 200 can be implemented by the encoding device 104 shown in FIG. 1. In some examples, the architecture 200 can be implemented by the encoder engine 106 of the encoding device 104 shown in FIG. 1.

In this example, the architecture 200 of the video encoding hardware engine can include a control processor 210, an interface 222, a video stream processor (VSP) 212, processing pipes 214-220, a direct memory access (DMA) subsystem 230, and one or more buffers 232. In some examples, the architecture 200 can include memory 240 for storing data such as frames, videos, coding information, outputs, etc. In other examples, the memory 240 can be external memory on the coding device implementing the video encoding hardware engine.

The interface 222 can transfer data between components of the video encoding hardware engine and/or the video coding device through a communication system or system bus on the video encoding hardware engine and/or the coding device implementing the video encoding hardware engine. For example, the interface 222 can connect the control processor 210, VSP 212, processing pipes 214-220, direct memory access (DMA) subsystem 230, and/or one or more buffers 232 with a system bus on the video encoding hardware engine and/or the coding device. In some examples, the interface 222 can include a network-based communications subsystem, such as a network-on-chip (NoC).

The DMA subsystem 230 can allow other components of the video encoding hardware engine (e.g., other components in the architecture 200) to access memory on the video encoding hardware engine and/or the video coding device implementing the video encoding hardware engine. For example, the DMA subsystem 230 can provide access to the memory 240 and/or the one or more buffers 232. In some examples, the DMA subsystem 230 can manage access to common memory units and associated data traffic (e.g., frame 202, blocks 204A-D, bitstream 236, decoded data 238, etc.).

The memory 240 can include one or more internal or external memory devices such as, for example and without limitation, one or more random access memory (RAM) components, read-only memory (ROM) components, cache memory components, buffer components, and/or other memory devices. The memory 240 can store data used by the video encoding hardware engine and/or the video coding device, such as frames, processing parameters, input data, output data, and/or any other type of data.

The control processor 210 can include one or more processors. The control processor 210 can control and/or program components of the video encoding hardware engine (e.g., other components in the architecture 200). In some examples, the control processor 210 can interface with other drivers, applications, and/or components that are not shown in FIG. 2A. For example, in some cases, the control processor 210 can interface with an application processor on the video coding device.

The VSP 212 can perform bitstream parsing (e.g., separating a network abstraction layer, a picture layer, and a slice layer) and entropy coding operations. In some examples, the VSP 212 can perform encoding functions such as variable length encoding. For example, the VSP 212 can implement a lossless compression algorithm to compress a bitstream 236. In some examples, the VSP 212 can perform arithmetic coding, such as context, adaptive binary arithmetic coding (CABAC), and/or any other coding algorithm.

The processing pipes 214-220 can perform video pixel operations such as motion estimation, motion compensation, transform and quantization, image deblocking, and/or any other video pixel operations. The processing pipes 214-220 (and/or each individual processing pipe) can perform specific video pixel operations in parallel. For example, each processing pipe can perform multiple operations (and/or process data) simultaneously and/or significantly in parallel. As another example, multiple processing pipes can perform operations (and/or process data) simultaneously and/or significantly in parallel.

In some examples, the processing pipes 214-220 can process pixels, blocks, and/or frames in parallel (or substantially in parallel). For example, the processing pipes 214-220 can perform video pixel processing operations in parallel across rows of blocks 204A, 204B, 204C, 204D of a frame 202. As another example, with reference to FIG. 2B, the processing pipes 214-220 can perform video pixel processing operations on multiple frames 250, 252, 254, 256 in parallel. In some examples, each processing pipe can perform video pixel processing operations in parallel on one or more frames. For example, processing pipe 214 can perform motion estimation, motion compensation, transform, quantization, and/or deblocking operations on one or more frames 250 in parallel.

Returning to FIG. 2A, the processing pipes 214-220 can store and retrieve video pixel processing data (e.g., video pixel processing outputs, inputs, parameters, pixel data, processing synchronization data, etc.) to and from the one or more buffers 232. In some cases, the one or more buffers 232 can include a single buffer. In other cases, the one or more buffers 232 can include multiple buffers. In some examples, the one or more buffers 232 can include a global input/output line buffer and a pipe synchronization buffer. In some cases, the pipe synchronization buffer can temporarily store data used to synchronize data and/or results from video pixel processing operations performed by the processing pipes 214-220.

In some examples, the VSP 212 can compress a bitstream 236 associated with a video or sequence of frames, and store entropy decoded data 238 associated with the bitstream 236 for processing by the processing pipes 214-220. In some cases, the VSP 212 can retrieve the bitstream 236 and store the entropy decoded data 238 to and from memory using the DMA subsystem 230, which can manage access to memory components and/or units as previously noted. The processing pipes 214-220 can retrieve the entropy decoded data 238 (e.g., via the DMA subsystem 230) and perform video pixel processing operations on blocks 204A-D of a frame 202 associated with the bitstream 236 (and/or on frames 250-256 as shown in FIG. 2B).

The processing pipes 214-220 can perform video pixel processing operations in parallel, as previously described. The processing pipes 214-220 can retrieve and store video pixel processing inputs and outputs from/in the one or more buffers 232 (e.g., via DMA subsystem 230). For example, a motion estimation algorithm implemented by the processing pipe 214 can perform motion estimation on block 204A and store motion estimation information calculated for block 204A in the one or more buffers 232. A motion compensation algorithm implemented by the processing pipe 214 can retrieve the motion estimation information from the one or more buffers 232, and use the motion estimation information to perform motion compensation for block 204A. While the motion compensation algorithm is performing the motion compensation, the motion estimation algorithm can perform motion estimation for a next block.

The motion compensation algorithm can store motion compensation results in the one or more buffers 232, which can be accessed and used by transform, quantization, and deblocking algorithms to perform transform, quantization and deblocking for the block 204A. The motion compensation algorithm can perform motion compensation for a next block while the transform, quantization, and/or deblocking algorithms perform the transform, quantization and/or deblocking for the block 204A. The transform, quantization and deblocking algorithms can similarly perform respective operations for the block 204A and the next block in parallel. In some examples, the motion estimation, motion compensation, transform, quantization, and deblocking algorithms can perform respective operations on different blocks in parallel.

The processing pipes 214-220 can be implemented by hardware and/or software components. For example, the processing pipes 214-220 can be implemented by one or more pixel processors. In some examples, each processing pipe can be implemented by one or more hardware components. In some cases, each processing pipe can use different hardware units and/or components to implement different stages in a pipeline of the processing pipe, such as pipeline 300 illustrated in FIG. 3A or modified pipeline 340 illustrated in FIG. 3B.

The number of processing pipes shown in FIGS. 2A and 2B is merely an example provided for explanation purposes. One of ordinary skill in the art will appreciate that the architecture 200 can include more or less processing pipes than shown in FIGS. 2A and 2B. For example, the number of processing pipes implemented by the architecture 200 can be increased or reduced to include more or less processing pipes. Moreover, while the architecture 200 is shown to include certain components, one of ordinary skill will appreciate that the architecture 200 can include more or fewer components than those shown in FIGS. 2A and 2B. For example, the architecture 200 can also include, in some instances, other memory devices (e.g., one or more random access memory (RAM) components, read-only memory (ROM) components, cache memory components, buffer components, database components, and/or other memory devices), processing devices (e.g., one or more CPUs, GPUs, and/or other processing devices), interfaces (e.g., internal bus, etc.), and/or other components that are not shown in FIGS. 2A and 2B.

Figure 3A:
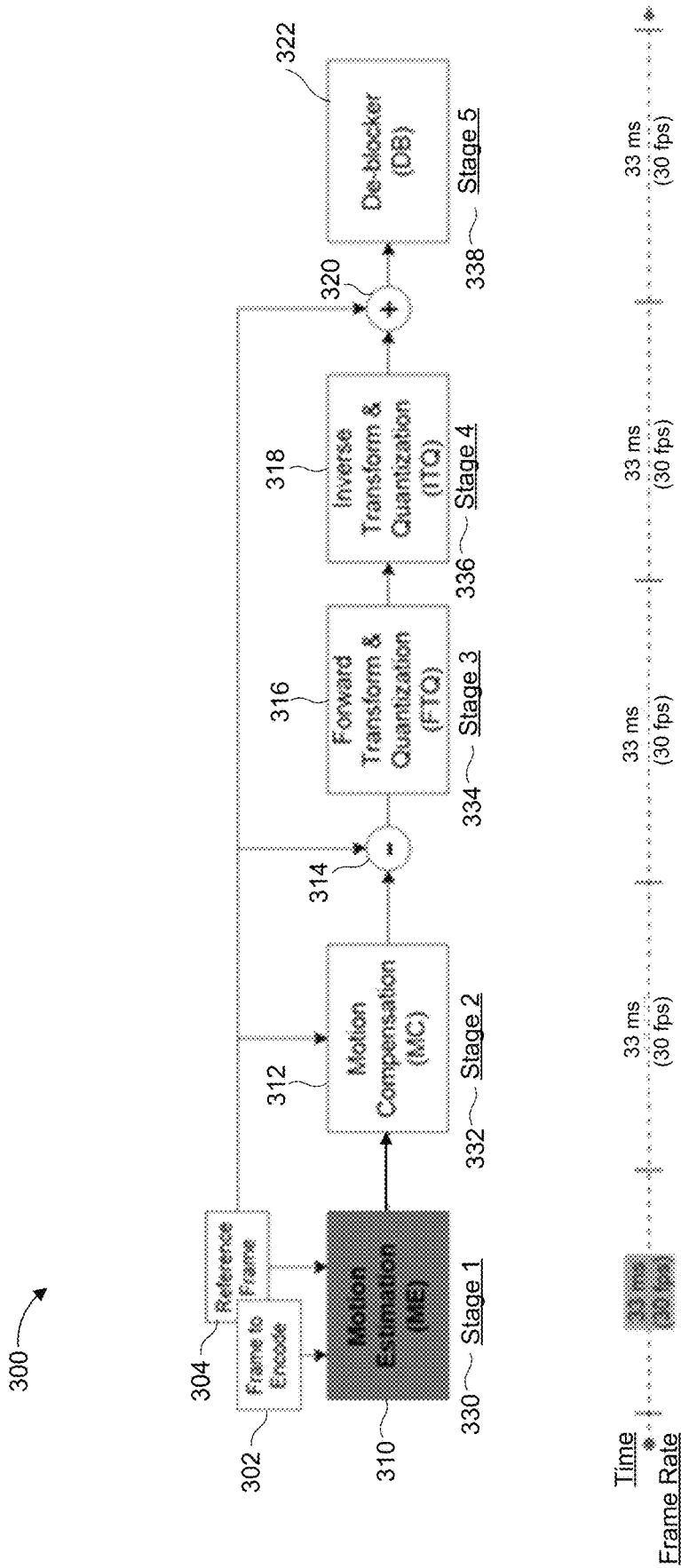
FIGS. 3A and 3B are diagrams illustrating example pipelines of operations implemented by a processing pipe of a video encoding hardware engine, in accordance with some examples of the disclosure.
Figure 3B:
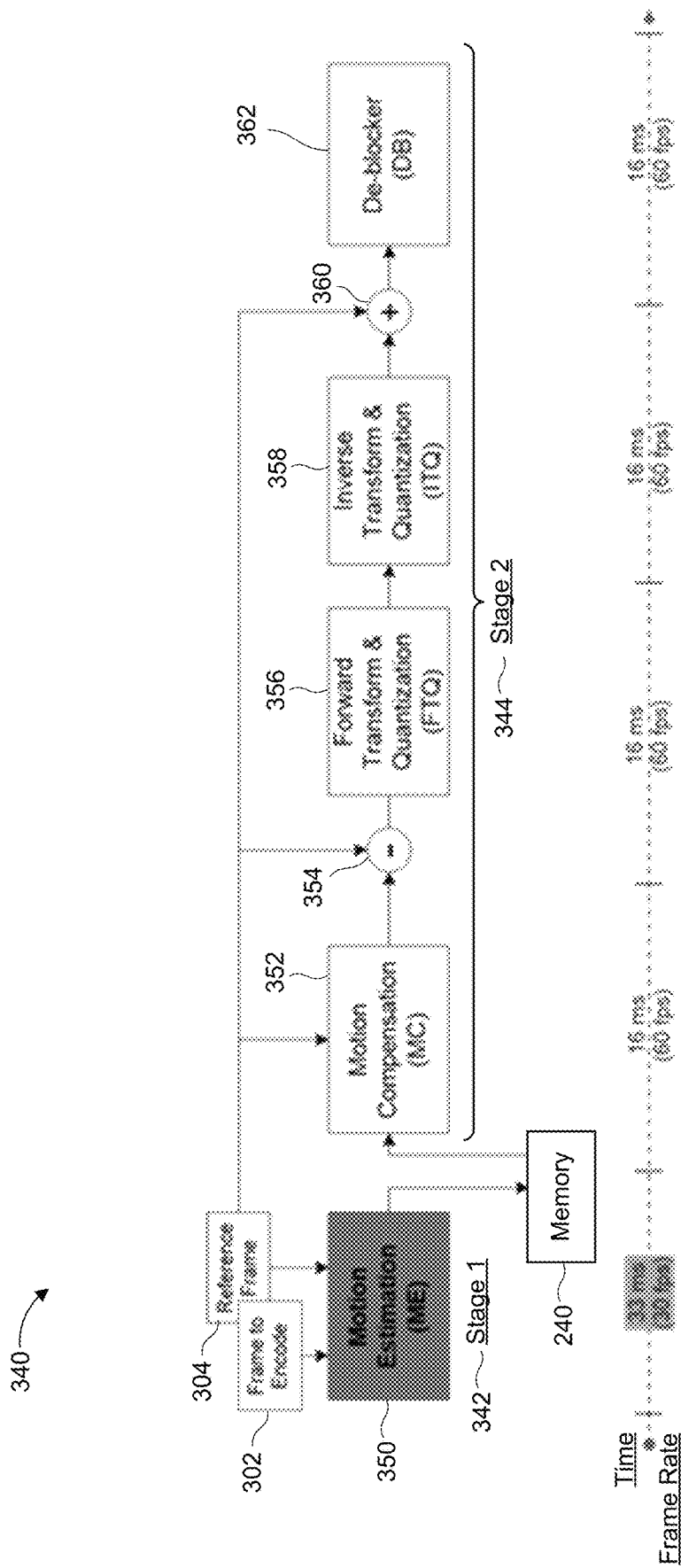

FIGS. 3A and 3B are diagrams illustrating example pipelines of operations implemented by a single processing pipe, such as processing pipe 214, 216, 218, or 220. FIG. 3A illustrates an example pipeline 300 including five stages of pixel processing operations, and FIG. 3B illustrates an example pipeline 340 modified to implement two stages of pixel processing operations, which can provide an increased performance without additional hardware (or with a smaller amount of additional hardware) and with higher silicon area efficiency (e.g., without increasing overall silicon area).

With reference to FIG. 3A, the five stages of pixel processing operations in the example pipeline 300 can include a stage 330 for motion estimation 310, a stage 332 for motion compensation 312, a stage 334 for forward transform and quantization 316, a stage 336 for inverse transform and quantization 318 and a stage 338 for image deblocking 322.

In some examples, a processing pipe can perform the five stages 330-338 of the pipeline 300 in parallel. For example, the processing pipe can perform, in parallel, each stage of the pipeline 300 for a different macroblock or LCU of a frame. To illustrate, at stage 330, a processing pipe can perform motion estimation 310 for a current block in a current frame 302 to determine motion information for the block. The processing pipe can use the current frame 302 and a reference frame 304 to perform the motion estimation 310. The motion information can include one or more motion vectors calculated for the current block. The motion information can also include a coding mode used in the motion estimation 310. The one or more motion vectors can estimate motion for the current block. For example, a motion vector may indicate the displacement of a prediction unit (PU) of the current block within the current frame 302 relative to a predictive block within the reference frame 304. In some examples, a predictive block can include a block that is found to closely match the PU of the current block in terms of pixel difference and/or temporal redundancy.

At stage 332, the processing pipe can use the reference frame 304 and the motion information from the motion estimation 310 to perform motion compensation 312 and image subtraction 314 for the current block. While performing the motion compensation 312 and image subtraction 314 for the current block, the processing pipe can perform stage 330 (e.g., motion estimation 310) for a second block. For example, the processing pipe can perform the motion compensation 312 and image subtraction 314 for the current block and motion estimation 310 for the second block in parallel.

The motion compensation 312 can include fetching or generating a predictive block based on the motion vector determined by the motion estimation 310. In some examples, the motion compensation 312 can locate the predictive block to which the motion vector points in a reference picture list. The image subtraction 314 can form a residual block by subtracting pixel values of the predictive block from the pixel values of the current block being coded, forming pixel difference values. The pixel difference values form residual data for the block, and may include luma and chroma difference components.

At stage 334, the processing pipe can perform forward transform and quantization 316 to transform the residual data from the motion compensation 312 into quantized transform coefficients. The processing pipe can apply a forward transform, such as a discrete cosine transform (DCT) or a conceptually similar transform. In some examples, the forward transform can convert the residual data from a pixel domain to a transform domain, such as a frequency domain. The processing pipe can quantize the transform coefficients to further reduce the bit rate. The quantization may reduce the bit depth associated with some or all of the coefficients. The degree of quantization may be modified by adjusting a quantization parameter.

The processing pipe can perform the forward transform and quantization 316 on the residual data while performing motion compensation 312 for the second block and performing motion estimation 310 for a third block. At stage 336, the processing pipe can perform inverse transform and quantization 318 to the quantized transform coefficients from the forward transform and quantization 316. In some examples, inverse transform and quantization 318 can reconstruct the residual block in the pixel domain for later use as a reference block.

Summer 320 can add the reconstructed residual block to the motion compensated prediction block produced by the motion compensation 312, to produce a reconstructed block. In some examples, the reconstructed block can be used as a reference block for stages 330 and 332 (e.g., the motion estimation 310 and motion compensation 312) to predict a different block.

The processing pipe can perform stage 336 (e.g., the inverse transform and quantization 318) while performing stage 334 (e.g., the forward transform and quantization 316) for a residual block associated with the second block, performing stage 332 (e.g., motion compensation 312) for the third block, and performing stage 330 (e.g., motion estimation 310) for a fourth block.

At stage 338, the processing pipe can apply deblocking 322 to the reconstructed block. The deblocking 322 can include one or more deblocking filters applied to the reconstructed block. The processing pipe can perform stage 338 (e.g., deblocking 322) on the reconstructed block while performing stage 336 (e.g., inverse transform and quantization 318) on quantized transform coefficients associated with the second block, performing stage 334 (e.g., forward transform and quantization 316) for a residual block associated with the third block, performing stage 332 (e.g., motion compensation 312) for the fourth block, and performing stage 330 (e.g., motion estimation 310) for a fifth block.

In some examples, the processing pipe can use hardware and/or software components to perform each stage (e.g., stage 330, stage 332, stage 334, stage 336, and stage 338) in the example pipeline 300. In some examples, the processing pipe can use a different portion of hardware and/or a different hardware unit or component for each stage (e.g., stage 330, stage 332, stage 334, stage 336, and stage 338) in the pipeline 300.

In some cases, the pipeline 300 can include more or less processing operations and/or stages than shown in FIG. 3A. In some examples, the pipeline 300 can include motion estimation 310, motion compensation 312 and one or more different operations that are not shown in FIG. 3A (either in addition to, or in lieu of, the forward transform and quantization 316, inverse transform and quantization 318, and/or the deblocking 322 shown in FIG. 3A).

In the example shown in FIG. 3A, each stage (e.g., stage 330, stage 332, stage 334, stage 336, and stage 338) of the example pipeline 300 operates at 30 frames-per-second (FPS). Accordingly, the pipeline 300 in this example can have an overall performance of 30 FPS. In some cases, this can translate to a time budget of approximately 33 milliseconds (ms) for processing the blocks in the current frame 302. The example FPS and time budge in FIG. 3A are merely illustrative examples provided for explanation purposes. One of ordinary skill in the art will appreciate that the pipeline 300 can operate according to other frame rates and time budgets.

In some cases, the overall performance can be increased by implementing additional processing pipes and increasing the memory pool in the DMA subsystem 230 to support the parallel operation of the additional processing pipes. For example, the overall performance of the pipeline 300 can be doubled by doubling the number of processing pipes used to implement the pipeline 300 and increasing the memory pool as needed. In some cases, processing pipes can account for a majority of the hardware area of the video encoding hardware engine. Therefore, doubling the processing pipes can result in an almost doubling of the overall silicon area of the video encoding engine, and therefore a significantly increase in the hardware cost for such a performance increase. Increasing the number of pipes by a different amount can similarly result in a corresponding, significant increase in the overall silicon area of the video encoding engine.

In some examples, instead of increasing the number of pipes as described above, the same (or significantly similar) performance boost can be achieved without such an increase in silicon area (and therefore hardware costs) using a modified pipeline, such as the example modified pipeline 340 shown in FIG. 3B.

In FIG. 3B, the modified pipeline 340 divides the pipeline into two stages performed by each processing pipe, including stage 342 and stage 344. Stage 342 includes motion estimation 350 and stage 344 includes motion compensation 352 and image subtraction 354, forward transform and quantization 356, inverse transform and quantization 358, summer 360, and deblocking 362.

In some examples, the motion estimation 350, motion compensation 352, image subtraction 354, forward transform and quantization 356, inverse transform and quantization 358, summer 360, and deblocking 362 can be implemented as described with respect to the motion estimation 310, motion compensation 312, image subtraction 314, forward transform and quantization 316, inverse transform and quantization 318, summer 320, and/or deblocking 322 shown in FIG. 3A. In other examples, the motion estimation 350, motion compensation 352, image subtraction 354, forward transform and quantization 356, inverse transform and quantization 358, summer 360, and/or deblocking 362 can differ from the motion estimation 310, motion compensation 312, image subtraction 314, forward transform and quantization 316, inverse transform and quantization 318, summer 320, and/or deblocking 322 shown in FIG. 3A.

As previously noted, motion estimation can be the most computationally intensive process in the video compression algorithm. For example, motion estimation can involve significantly-repetitive operations applied to each frame, which place a high burden on hardware resources. Indeed, motion estimation can be significantly more computationally intensive/complex than the motion compensation, image subtraction, forward transform and quantization, inverse transform and quantization, summer, and deblocking shown in FIGS. 3A and 3B.

To increase the overall video coding performance without a corresponding increase in silicon area and hardware costs, the modified pipeline 340 can perform the motion estimation 350 at stage 342 for a limited number of frames, and use the motion estimation information from the limited number of frames when performing stage 344 for the larger set of frames (e.g., the full set of frames in a sequence). For example, the modified pipeline 340 can perform stage 342 at a reduced or lower frame rate than stage 344 to achieve a higher overall performance. Stated otherwise, the modified pipeline 340 can perform stage 344 at a higher frame rate than stage 342.

To illustrate, like stage 330 in FIG. 3A, stage 342 is shown in FIG. 3B operating at 30 FPS. However, stage 344 is shown in FIG. 3B operating at 60 FPS, with each operation in stages 342 and 344 performed in parallel. Accordingly, the overall performance in the modified pipeline 340 is increased to 60 FPS, as opposed to the 30 FPS performance shown in FIG. 3A, without increasing the number of processing pipes or other hardware components. Because the motion estimation 350 in stage 342 operates at 30 FPS, the motion estimation information from stage 342 is calculated for a smaller number of frames than the frames processed at stage 344. Stage 344 can use this motion estimation information for the frames processed at stage 342 as well as the additional frames processed at stage 344. For the additional frames, stage 344 can use motion estimation information predicted or interpolated from other frames, as further described herein. The operations for predicting or interpolating the motion estimation information for the additional frames can be significantly less computationally intensive than the motion estimation 350. This allows stage 344 to perform its respective operations at a higher frame rate without additional hardware requirements and while maintaining a high quality.

As shown, at stage 342, the processing pipe uses the current frame 302 and the reference frame 304 to perform the motion estimation 350. In some examples, the processing pipe performs the motion estimation 350 for the entire current frame. The processing pipe then saves the motion estimation information (e.g., motion vectors and coding modes) in memory 240. In some examples, the memory 240 can be an external memory on the video coding device (e.g., external to the video encoding engine). In other examples, the memory 240 can be located elsewhere. For example, the memory 240 can be internal memory on the video encoding engine.

At stage 344, the processing pipe retrieves the motion estimation information from the memory 240, and use the retrieved motion estimation information for the motion compensation 352. Given the lower frame rate of stage 342 relative to stage 344, the retrieved motion estimation information may not include motion estimation information for a number of frames. For example, the retrieved motion estimation information will not include motion estimation information for any frames in the sequence of frames that were not processed by stage 342. For such frames, the processing pipe can estimate or predict motion vectors and modes.

In some cases, the processing pipe can interpolate or extrapolate the motion vector and mode for each of such frames (the frames that were not processed by stage 342) using temporal interpolation or a pre-processing method. For example, the processing pipe can interpolate or extrapolate the motion vector of the temporally closest frame. In some cases, the processing pipe can interpolate or extrapolate the motion vector and mode for a frame using the motion vector of the temporally closest frame that was processed by stage 342. In other cases, the processing pipe can interpolate or extrapolate the motion vector and mode for a frame using the motion vector of the temporally closest frame that has an interpolated or extrapolated motion vector.

In some examples, for the frames that did not go through the motion estimation 350 of stage 342, the processing pipe can estimate their motion vectors from the nearest frame that did go through the motion estimation 350 using a translational model as shown in Equation 1 below:

$$MV_{2,0}^i = \frac{\Delta_{2,0}^t}{\Delta_{3,0}^t} MV_{3,0}^i \qquad \text{Equation (1)}$$

Where $MV_{j,k}^i$ is the motion vector of the coding unit i derived from frame j where the reference frame is k, and $\Delta_{i,j}^t$ is the temporal distance between frames i and j.

When determining from which frames to estimate motion vectors, the processing pipe can take into account frame dependencies. For example, the processing pipe can implement a coding structure that takes into account frame dependencies as shown in FIG. 4 and further described below.

The processing pipe can use the motion estimation information from stage 342 and the estimated motion vectors and modes for frames that skipped stage 342, to complete the remaining operations in stage 344 for all frames. For example, using the motion estimation information from stage 342 and the estimated motion vectors and modes for frames that skipped stage 342, the processing pipe can perform the motion compensation 352, image subtraction 354, forward transform and quantization 356, inverse transform and quantization 358, summer 360, and deblocking 362.

The example frame rates, relative frame rate ratios, and time information in FIG. 3B are merely illustrative examples provided for explanation purposes. One of ordinary skill in the art will appreciate that the modified pipeline 340 and stages in the modified pipeline 340 can operate according to other frame rates, frame rate ratios and time budgets. While FIG. 3B illustrates stage 344 operating at double the frame rate as stage 342, the relative frame rates are only illustrative examples provided for explanation purposes. Other relative frame rates and frame rate ratios are also contemplated herein. For example, in some cases, the frame rate of stage 342 can be a third, fourth, etc., of the frame rate of stage 344. To illustrate, the processing pipe can implement stage 342 at 30 FPS and stage 344 at 90 FPS. In this example, the processing pipe can process a third of the total frames at stage 342, and skip stage 342 for the remaining frames.

Figure 4:
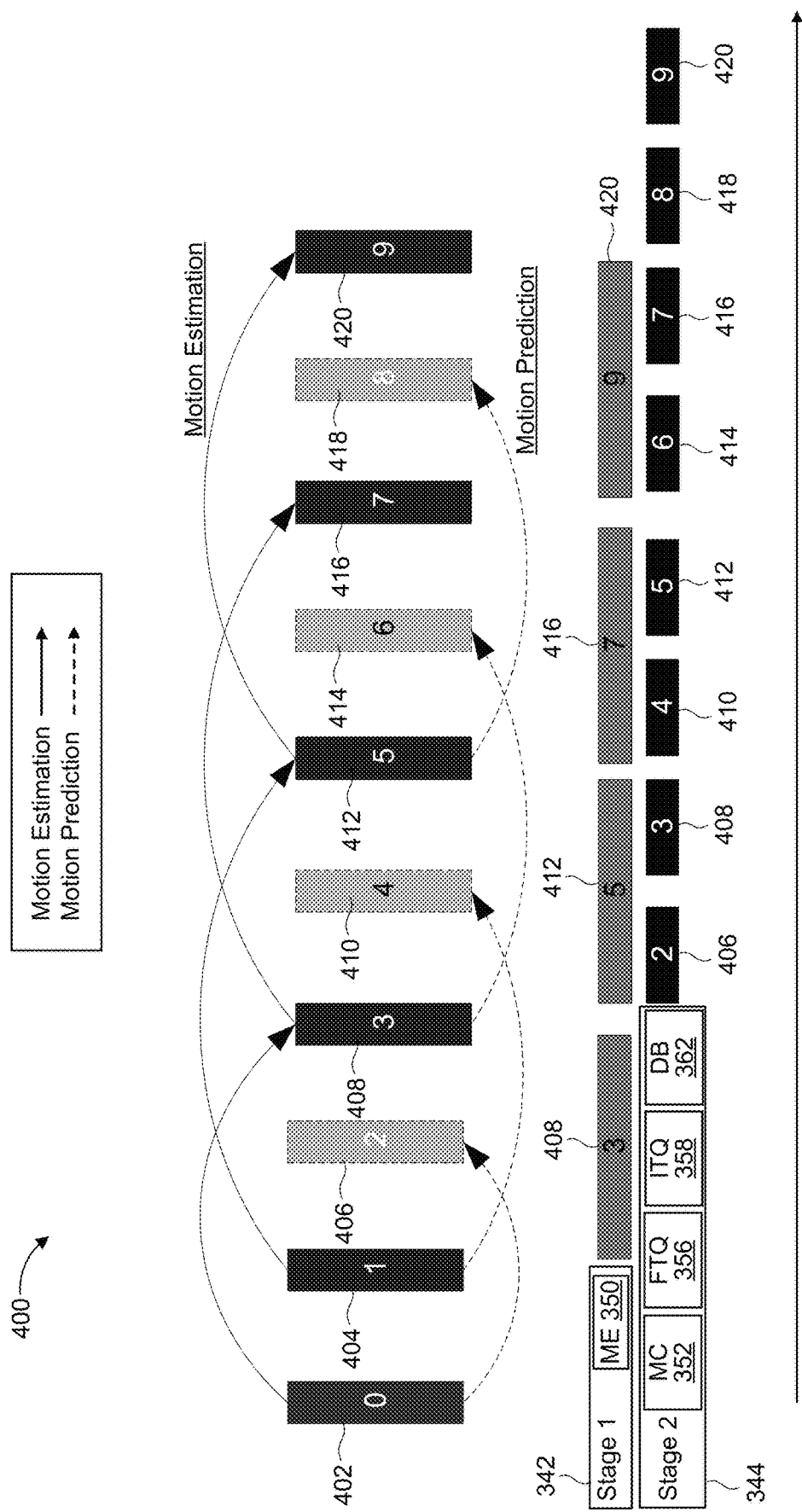
FIG. 4 is a diagram illustrating an example coding pattern for a modified pipeline for efficient video coding, in accordance with some examples of the disclosure.

FIG. 4 is a diagram illustrating an example coding pattern 400 for a modified pipeline 340. The coding pattern 400 takes into account the processing times of operations at stage 342 and stage 344 and frame dependencies when processing frames, as further described herein. For example, motion estimation (ME) 350 is more time consuming than motion compensation (MC) 352, forward transform and quantization (FTQ) 356, inverse transform and quantization (ITQ) 358, and deblocking (DB) 362. The coding pattern 400 can take into account such timing information to ensure that the processing of frames is arranged such that operation has to wait for another operation(s) to complete.

In this example, frame 412 is processed at stage 342 while (e.g., simultaneously, in parallel) frames 406 and 408 are processed at stage 344, frame 416 is processed at stage 342 while frames 410 and 412 are processed at stage 344, and frame 420 is processed at stage 342 while frames 414 and 416 are processed at stage 344. Frame 408 is processed at stage 342 before frame 412 is processed at stage 342 and before frames 406 and 408 are processed at stage 344. Frame 402 and 404 are processed at stages 342 and 344 before frame 408 is processed at stage 342, and frames 418 and 420 are processed at stage 344 after frame 420 is processed at stage 342 and frames 414 and 416 are processed at stage 344.

As shown, frame 402 is the reference frame for frame 408, frame 404 is the reference frame for frame 410, frame 408 is the reference frame for 416, and frame 412 is the reference frame for frame 420. Moreover, frame 402 is the reference frame used to predict the motion vector for frame 406, frame 404 is the reference frame used to predict the motion vector for frame 410, frame 408 is the reference frame used to predict the motion vector for frame 414, and frame 412 is the reference frame used to predict the motion vector for frame 418.

The processing pipe performs motion estimation 350 at stage 342 for frames 402, 404, 408, 412, 416, and 420. On the other hand, the processing pipe skips motion estimation 350 at stage 342 for frames 406, 410, 414, and 418. Instead, processing pipe predicts motion vectors and modes for frames 406, 410, 414, and 418 using interpolation or extrapolation as previously described. In this example, the motion vector for frame 406 is predicted (e.g., via interpolation or extrapolation) at stage 344 from frame 402, the motion vector for frame 410 is predicted at stage 344 from frame 404, the motion vector for frame 414 is predicted at stage 344 from frame 408, and the motion vector for frame 418 is predicted at stage 344 from frame 412.

The reference frames used to predict the motion vectors for frames 406, 410, 414, and 418 are only illustrative examples provided for explanation purposes. The specific frame dependencies of the frames can allow for other patterns to be implemented. For example, in the illustrated example, frame 408 is used to predict the motion vector for frame 414. However, in an alternative example, frame 410 can be used to predict the motion vector for frame 414. As shown in FIG. 4, frame 410 has been reconstructed at stage 344 by the time frame 414 is processed. Accordingly, using frame 410 to predict the motion vector for frame 414 would not create a dependency conflict/error. In some cases, using frame 408 as a reference frame for the motion vector prediction for frame 414 may be less complicated than using frame 410, as the motion for frame 414 could more easily be estimated somewhere between the motion previously estimated for frames 408 and 416. On the other hand, frame 410 is temporally closer to frame 414 than frame 408 so the residual may be lower.

The decision of what frame to use as a reference frame for predicting the motion vector of another frame can be predetermined or dynamically made based on preferences, advantages, disadvantages, and/or any other factors. However, such decisions are constrained by frame dependencies. For example, frame 412 in FIG. 4 uses frame 404 as a reference frame. As previously explained, there can be certain advantages in instead using a temporally closer frame, such as frame 406 or 408. In this example, frames 406 and 408 are temporally closer than frame 404 but frames 406 and 408 have not completed reconstruction at stage 344 when frame 412 is processed at stage 342. This creates a dependency error that prevents frame 406 or 408 from being used as a reference frame for frame 412. Similarly, while frame 410 is temporally closer to frame 412, frame 410 also cannot be used as a reference frame for frame 412 as frame 410 has not completed (or even started) reconstruction when frame 412 is processed at stage 342.

The coding pattern 400 in FIG. 4 is described in terms of processing of entire frames. However, the principles described above can be applied to processing of subframes. For example, frames can be split into subframes and the coding pattern 400 can be based on and/or implemented for subframes. Using subframes instead of entire frames may affect the frame dependencies, the options for which frames to use as reference frames, and the coding efficiency.

FIG. 5 is a flowchart illustrating an example process 500 for efficient video coding. At block 502, the process 500 can include determining, during a first video coding stage (e.g., stage 342) implemented at a first frame rate, first motion vectors for a first subset of frames in a sequence of frames.

The first motion vectors can be determined by performing motion estimation (e.g., motion estimation 350) on the first subset of frames. In some examples, determining the first motion vectors can include determining motion vectors and coding modes for the first subset of frames.

In some examples, determining the first motion vectors can include, for each frame in the first subset of frames, comparing one or more blocks of the frame with a plurality of blocks in a reference frame from the sequence of frames; determining a predictive block from the plurality of blocks based on respective pixel differences between the one or more blocks of the frame and each of the plurality of blocks in the reference frame; and comparing a first position of the one or more blocks of the frame with a second position of the predictive block associated with the reference frame.

At block 504, the process 500 can include determining, during a second video coding stage (e.g., stage 344), second motion vectors for a second subset of frames in the sequence of frames. The second subset of frames can include more frames than the first subset of frames. The second subset of frames can include frames that were not processed in the first video coding stage.

In some examples, at least a portion of the second motion vectors can be calculated based on one or more motion vectors from the first motion vectors. In some cases, each motion vector from the portion of the second motion vectors is calculated based on a separate motion vector of a selected frame (e.g., a reference frame) from the first subset of frames and/or a temporal distance between the selected frame and a particular frame associated with the motion vector (e.g., the particular frame for which the motion vector is determined).

In some examples, one or more motion vectors of the second motion vectors are calculated based on one or more additional motion vectors of the second motion vectors and a temporal distance between one or more frames associated with the one or more vectors and one or more reference frames associated with the one or more additional motion vectors.

At block 506, the process 500 can include reconstructing, during the second video coding stage, the first subset of frames using the first motion vectors. In some examples, reconstructing the first subset of frames can include applying motion compensation, applying one or more transforms and coefficient quantizations and/or applying one or more deblocking filters. For example, reconstructing the first subset of frames can include applying motion compensation (e.g., motion compensation 352), applying forward transforms and quantizations (e.g., forward transform and quantization 356), applying inverse transforms and quantizations (e.g., inverse transform and quantization 358), and/or applying one or more deblocking filters (e.g., deblocking 362).

At block 508, the process 500 can include reconstructing, during the second video coding stage, the second subset of frames using the second motion vectors. The first video coding stage and the second video coding stage can be implemented at least partly in parallel. Moreover, the second video coding stage can be implemented at a second frame rate that is higher than the first frame rate. Thus, the second video coding stage can process more frames than the first video coding stage during a particular interval. In some cases, the first subset of frames and the second subset of frames are reconstructed at the second frame rate.

In some examples, reconstructing the second subset of frames can include applying motion compensation, applying one or more transforms and coefficient quantizations and/or applying one or more deblocking filters. For example, reconstructing the second subset of frames can include applying motion compensation (e.g., motion compensation 352), applying forward transforms and quantizations (e.g., forward transform and quantization 356), applying inverse transforms and quantizations (e.g., inverse transform and quantization 358), and/or applying one or more deblocking filters (e.g., deblocking 362).

In some cases, the process 500 can include determining a coding pattern (e.g., coding pattern 400) for reconstructing the first subset of frames and the second subset of frames, the coding pattern defining an order for reconstructing frames and a respective reference frame for determining each of the first motion vectors and each of the second motion vectors; and reconstructing the first subset of frames and the second subset of frames according to the coding pattern.

In some examples, the first video coding stage and the second video coding stage can be part of a processing pipeline (e.g., modified pipeline 340).

In some examples, the coding pattern is based on frame dependencies and/or a temporal distance between each frame in the sequence of frames. In some cases, the frame dependencies can include a requirement that, for each frame in the sequence of frames, a reference frame used to code the frame has completed being reconstructed.

In some examples, the process 500 can include, at each interval associated with the first frame rate, determining a motion vector of a frame from the first subset of frames, determining a motion vector of a number of different frames from the second subset of frames, and reconstructing the number of different frames from the second subset of frames. In some cases, the motion vector of the frame can include one or more of the first motion vectors, and the number of different frames can be based on the second frame rate associated with the second video coding stage.

In some examples, the first video coding stage and the second video coding stage are implemented via a dedicated hardware processing pipe (e.g., video processing pipe 214, 216, 218, or 220). In some cases, the dedicated hardware processing pipe can include one or more processors and/or processing components. In some examples, the dedicated hardware processing pipe can be implemented by a device, and the device can implement one or more additional dedicated hardware processing pipes (e.g., video processing pipe 214, 216, 218, or 220), where each of the one or more additional dedicated hardware processing pipes is configured to separately implement the first video coding stage and the second video coding stage to one or more respective sequences of frames. In some examples, the dedicated hardware processing pipe and the one or more additional dedicated hardware processing pipes can operate in parallel.

In some examples, the first motion vectors are determined using a motion estimation algorithm and the second motion vectors are determined using an interpolation algorithm. The motion estimation algorithm can be different than the interpolation algorithm. In some examples, the motion estimation algorithm can include more processing operations and/or can be more computationally intensive than the motion estimation algorithm.

In some cases, the process 500 can be implemented via a hardware video encoding engine (e.g., video encoding engine with the architecture 200 shown in FIG. 2A or 2B). In some cases, the process 500 can include generating an encoded video bitstream. The encoded video bitstream can include the sequence of frames. In some examples, the process 500 can include transmitting the encoded video bitstream.

In some examples, the processes described herein may be performed by a computing device or an apparatus, such as the encoding device 104, the decoding device 112, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Specific details of the encoding device 104 and the decoding device 112 are shown in FIG. 6 and FIG. 7 respectively. FIG. 6 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 6 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 6, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of this disclosure have generally been described with respect to the encoding device 104, but as mentioned above, some of the techniques of this disclosure may also be implemented by post processing device 57.

The encoding device 104 of FIG. 6 represents an example of a video encoder configured to perform one or more of the transform coding techniques described herein. The encoding device 104 may perform any of the techniques described herein, including the processes described above with respect to FIG. 5.

FIG. 7 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 6.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 7 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

The decoding device 112 of FIG. 7 represents an example of a video decoder configured to perform one or more of the transform coding techniques described herein. The decoding device 112 may perform any of the techniques described herein, including the process 500 described above with respect to FIG. 5.

In the foregoing description, aspects of the application are described with reference to specific embodiments thereof, but those skilled in the art will recognize that the subject matter of this application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1: A method for processing video data, the method comprising: determining, during a first video coding stage implemented at a first frame rate, first motion vectors for a first subset of frames in a sequence of frames; determining, during a second video coding stage implemented at a second frame rate that is higher than the first frame rate, second motion vectors for a second subset of frames in the sequence of frames, wherein at least a portion of the second motion vectors is calculated based on one or more motion vectors from the first motion vectors; reconstructing, during the second video coding stage, the first subset of frames using the first motion vectors; and reconstructing, during the second video coding stage, the second subset of frames using the second motion vectors, wherein the first video coding stage and the second video coding stage are implemented at least partly in parallel.

Aspect 2: The method of Aspect 1, wherein each motion vector from at least the portion of the second motion vectors is calculated based on a separate motion vector of a selected frame from the first subset of frames and a temporal distance between the selected frame and a particular frame associated with each motion vector.

Aspect 3: The method of any of Aspects 1 to 2, wherein estimating the first motion vectors comprises: for a frame in the first subset of frames, comparing one or more blocks of the frame with a plurality of blocks in a reference frame from the sequence of frames; determining a predictive block from the plurality of blocks based on respective pixel differences between the one or more blocks of the frame and each of the plurality of blocks in the reference frame; and comparing a first position of the one or more blocks of the frame with a second position of the predictive block associated with the reference frame.

Aspect 4: The method of any of Aspects 1 to 3, wherein one or more motion vectors of the second motion vectors are calculated based on one or more additional motion vectors of the second motion vectors, and a temporal distance between one or more frames associated with the one or more motion vectors and one or more reference frames associated with the one or more additional motion vectors.

Aspect 5: The method of any of Aspects 1 to 4, further comprising: determining a coding pattern for reconstructing the first subset of frames and the second subset of frames, the coding pattern defining an order for reconstructing frames and a respective reference frame for determining each of the first motion vectors and each of the second motion vectors; and reconstructing the first subset of frames and the second subset of frames according to the coding pattern.

Aspect 6: The method of Aspect 5, wherein the coding pattern is based on at least one of frame dependencies and a temporal distance between each frame in the sequence of frames.

Aspect 7: The method of Aspect 6, wherein the frame dependencies comprise a requirement that, for each frame in the sequence of frames, a reference frame used to reconstruct each frame has completed being reconstructed.

Aspect 8: The method of any of Aspects 1 to 7, further comprising: at each interval associated with the first frame rate, determining a motion vector of a frame from the first subset of frames, determine respective motion vectors of a number of different frames from the second subset of frames, and reconstruct the number of different frames from the second subset of frames.

Aspect 9: The method of Aspect 8, wherein the motion vector of the frame comprises at least one of the first motion vectors, and wherein the number of different frames is based on the second frame rate associated with the second video coding stage.

Aspect 10: The method of any of Aspects 1 to 9, wherein reconstructing the first subset of frames and the second subset of frames comprises applying to the first subset of frames and the second subset of frames at least one of motion compensation, one or more transforms and coefficient quantizations, and one or more deblocking filters.

Aspect 11: The method of any of Aspects 1 to 10, wherein the first video coding stage and the second video coding stage are implemented via a dedicated hardware processing pipe, wherein the dedicated hardware processing pipe comprises one or more processors.

Aspect 12: The method of Aspect 11, further comprising: separately implementing, via one or more additional dedicated hardware processing pipes, the first video coding stage and the second video coding stage to one or more respective sequences of frames.

Aspect 13: The method of any of Aspects 1 to 12, wherein the first motion vectors are determined using a motion estimation algorithm and the second motion vectors are determined using an interpolation algorithm, the motion estimation algorithm being different than the interpolation algorithm.

Aspect 14: The method of any of Aspects 1 to 13, further comprising: generating an encoded video bitstream, the encoded video bitstream including the sequence of frames.

Aspect 15: The method of Aspect 14, further comprising: transmitting the encoded video bitstream.

Aspect 16: The method of any of Aspects 1 to 15, wherein the second subset of frames includes more frames than the first subset of frames.

Aspect 17: The method of any of Aspects 1 to 16, wherein the first subset of frames and the second subset of frames are reconstructed at the second frame rate.

Aspect 18: An apparatus for processing video data, the apparatus comprising memory and one or more processors coupled to the memory, the one or more processors being configured to: determine, during a first video coding stage implemented at a first frame rate, first motion vectors for a first subset of frames in a sequence of frames; determine, during a second video coding stage implemented at a second frame rate that is higher than the first frame rate, second motion vectors for a second subset of frames in the sequence of frames, wherein at least a portion of the second motion vectors is calculated based on one or more motion vectors from the first motion vectors; reconstruct, during the second video coding stage, the first subset of frames using the first motion vectors; and reconstruct, during the second video coding stage, the second subset of frames using the second motion vectors, wherein the first video coding stage and the second video coding stage are implemented at least partly in parallel.

Aspect 19: The apparatus of Aspect 18, wherein each motion vector from at least the portion of the second motion vectors is calculated based on a separate motion vector of a selected frame from the first subset of frames and a temporal distance between the selected frame and a particular frame associated with each motion vector.

Aspect 20: The apparatus of any of Aspects 18 to 19, wherein, to estimate the first motion vectors, the one or more processors are configured to: for a frame in the first subset of frames, compare one or more blocks of the frame with a plurality of blocks in a reference frame from the sequence of frames; determine a predictive block from the plurality of blocks based on respective pixel differences between the one or more blocks of the frame and each of the plurality of blocks in the reference frame; and compare a first position of the one or more blocks of the frame with a second position of the predictive block associated with the reference frame.

Aspect 21: The apparatus of any of Aspects 18 to 20, wherein one or more motion vectors of the second motion vectors are calculated based on one or more additional motion vectors of the second motion vectors, and a temporal distance between one or more frames associated with the one or more motion vectors and one or more reference frames associated with the one or more additional motion vectors.

Aspect 22: The apparatus of any of Aspects 18 to 21, wherein the one or more processors are configured to: determine a coding pattern for reconstructing the first subset of frames and the second subset of frames, the coding pattern defining an order for reconstructing frames and a respective reference frame for determining each of the first motion vectors and each of the second motion vectors; and reconstruct the first subset of frames and the second subset of frames according to the coding pattern.

Aspect 23: The apparatus of Aspect 22, wherein the coding pattern is based on at least one of frame dependencies and a temporal distance between each frame in the sequence of frames.

Aspect 24: The apparatus of Aspect 23, wherein the frame dependencies comprise a requirement that, for each frame in the sequence of frames, a reference frame used to reconstruct each frame has completed being reconstructed.

Aspect 25: The apparatus of any of Aspects 18 to 24, wherein the one or more processors are configured to: at each interval associated with the first frame rate, determine a motion vector of a frame from the first subset of frames, determine respective motion vectors of a number of different frames from the second subset of frames, and reconstruct the number of different frames from the second subset of frames.

Aspect 26: The apparatus of Aspect 25, wherein the motion vector of the frame comprises at least one of the first motion vectors, and wherein the number of different frames is based on the second frame rate associated with the second video coding stage.

Aspect 27: The apparatus of any of Aspects 18 to 26, wherein, to reconstruct the first subset of frames and the second subset of frames, the one or more processors are configured to apply to the first subset of frames and the second subset of frames at least one of motion compensation, one or more transforms and coefficient quantizations, and one or more deblocking filters.

Aspect 28: The apparatus of any of Aspects 18 to 27, wherein the first video coding stage and the second video coding stage are implemented via a dedicated hardware processing pipe of the apparatus, wherein the dedicated hardware processing pipe comprises the one or more processors.

Aspect 29: The apparatus of Aspect 28, further comprising one or more additional dedicated hardware processing pipes, wherein each of the one or more additional dedicated hardware processing pipes is configured to separately implement the first video coding stage and the second video coding stage to one or more respective sequences of frames.

Aspect 30: The apparatus of any of Aspects 18 to 29, wherein the first motion vectors are determined using a motion estimation algorithm and the second motion vectors are determined using an interpolation algorithm, the motion estimation algorithm being different than the interpolation algorithm.

Aspect 31: The apparatus of any of Aspects 18 to 30, wherein the one or more processors are configured to: generate an encoded video bitstream, the encoded video bitstream including the sequence of frames.

Aspect 32: The apparatus of Aspect 31, wherein the one or more processors are configured to: transmit the encoded video bitstream.

Aspect 33: The apparatus of any of Aspects 18 to 32, wherein the apparatus is a mobile device.

Aspect 34: The apparatus of any of Aspects 18 to 33, further comprising a hardware video encoding engine.

Aspect 35: The apparatus of any of Aspects 18 to 34, wherein the second subset of frames includes more frames than the first subset of frames.

Aspect 36: The apparatus of any of Aspects 18 to 35, wherein the first subset of frames and the second subset of frames are reconstructed at the second frame rate.

Aspect 37: The apparatus of any of Aspects 18 to 36, further comprising a camera configured to capture one or more frames.

Aspect 38: The apparatus of any of Aspects 18 to 37, further comprising a display configured to display one or more frames.

Aspect 39: A non-transitory computer-readable medium having stored thereon instructions which, when executed by one or more processors, cause the one or more processors to perform operations according to any of Aspects 1 to 38.

Aspect 40: An apparatus comprising means for performing operations according to any of Aspects 1 to 38.

What is claimed is:

1. An apparatus for processing video data, the apparatus comprising:
   memory; and
   one or more processors coupled to the memory, the one or more processors being configured to:
   determine, during a first video coding stage implemented at a first frame rate, first motion vectors for a first subset of frames in a sequence of frames;
   output the first motion vectors for storage in the memory for use in a second video coding stage;
   determine, during a second video coding stage implemented at a second frame rate that is higher than the first frame rate, second motion vectors for a second subset of frames in the sequence of frames, the second subset of frames including first frames that were processed during the first video coding stage and second frames that were not processed during the first video coding stage, wherein a first portion of the second motion vectors determined for the first frames during the second video coding stage includes the first motion vectors stored in the memory and a second portion of the second motion vectors determined for the second frames during the second video coding stage is predicted using one or more motion vectors from the first motion vectors stored in the memory, and wherein the second subset of frames includes a greater number of frames than the first subset of frames based on the second frame rate being higher than the first frame rate;
   reconstruct, during the second video coding stage at the second frame rate, the first subset of frames using the first motion vectors determined during the first video coding stage; and
   reconstruct, during the second video coding stage at the second frame rate, the second subset of frames using the second motion vectors determined during the second video coding stage, wherein the first video coding stage and the second video coding stage are implemented at least partly in parallel.

2. The apparatus of claim 1, wherein each motion vector from the second portion of the second motion vectors is calculated based on a separate motion vector of a selected frame from the first subset of frames and a temporal distance between the selected frame and a particular frame associated with each motion vector.

3. The apparatus of claim 1, wherein, to determine the first motion vectors, the one or more processors are configured to:
for a frame in the first subset of frames, compare one or more blocks of the frame with a plurality of blocks in a reference frame from the sequence of frames;
determine a predictive block from the plurality of blocks based on respective pixel differences between the one or more blocks of the frame and each of the plurality of blocks in the reference frame; and
compare a first position of the one or more blocks of the frame with a second position of the predictive block associated with the reference frame.

4. The apparatus of claim 1, wherein the second portion of the second motion vectors is predicted based on a temporal distance between one or more frames associated with the second portion of the second motion vectors and one or more reference frames associated with the one or more motion vectors from the first motion vectors stored in the memory.

5. The apparatus of claim 1, wherein the one or more processors are configured to:
determine a coding pattern for reconstructing the first subset of frames and the second subset of frames, the coding pattern defining an order for reconstructing frames and a respective reference frame for determining each of the first motion vectors and each of the second motion vectors; and
reconstruct the first subset of frames and the second subset of frames according to the coding pattern.

6. The apparatus of claim 5, wherein the coding pattern is based on at least one of frame dependencies or a temporal distance between each frame in the sequence of frames.

7. The apparatus of claim 6, wherein the frame dependencies comprise a requirement that, for each frame in the sequence of frames, a reference frame used to reconstruct each frame has completed being reconstructed.

8. The apparatus of claim 1, wherein the one or more processors are configured to:
at each interval associated with the first frame rate, determine a motion vector of a frame from the first subset of frames, determine respective motion vectors of a number of different frames from the second subset of frames, and reconstruct the number of different frames from the second subset of frames.

9. The apparatus of claim 8, wherein the motion vector of the frame comprises at least one of the first motion vectors, and wherein the number of different frames is based on the second frame rate associated with the second video coding stage.

10. The apparatus of claim 1, wherein, to reconstruct the first subset of frames and the second subset of frames, the one or more processors are configured to apply to the first subset of frames and the second subset of frames at least one of motion compensation, one or more transforms and coefficient quantizations, or one or more deblocking filters.

11. The apparatus of claim 1, wherein the first video coding stage and the second video coding stage are implemented via a dedicated hardware processing pipe of the apparatus, wherein the dedicated hardware processing pipe comprises the one or more processors.

12. The apparatus of claim 11, further comprising one or more additional dedicated hardware processing pipes, wherein each of the one or more additional dedicated hardware processing pipes is configured to separately implement the first video coding stage and the second video coding stage to one or more respective sequences of frames.

13. The apparatus of claim 1, wherein the first motion vectors are determined using a motion estimation algorithm and the second motion vectors are determined using an interpolation algorithm, the motion estimation algorithm being different than the interpolation algorithm.

14. The apparatus of claim 1, wherein the one or more processors are configured to:
generate an encoded video bitstream, the encoded video bitstream including the sequence of frames.

15. The apparatus of claim 14, wherein the one or more processors are configured to:
transmit the encoded video bitstream.

16. The apparatus of claim 1, wherein the apparatus is a mobile device.

17. The apparatus of claim 1, further comprising a hardware video encoding engine.

18. A method for processing video data, the method comprising:
determining, during a first video coding stage implemented at a first frame rate, first motion vectors for a first subset of frames in a sequence of frames;
store the first motion vectors in a memory for use in a second video coding stage;
determining, during a second video coding stage implemented at a second frame rate that is higher than the first frame rate, second motion vectors for a second subset of frames in the sequence of frames, wherein the second subset of frames includes first frames that were processed during the first video coding stage and second frames that were not processed during the first video coding stage, wherein a first portion of the second motion vectors determined for the first frames during the second video coding stage includes the first motion vectors stored in the memory and a second portion of the second motion vectors determined for the second frames during the second video coding stage is predicted using one or more motion vectors from the first motion vectors stored in the memory, and wherein the second subset of frames includes a greater number of frames than the first subset of frames based on the second frame rate being higher than the first frame rate;
reconstructing, during the second video coding stage at the second frame rate, the first subset of frames using the first motion vectors determined during the first video coding stage; and
reconstructing, during the second video coding stage at the second frame rate, the second subset of frames using the second motion vectors determined during the second video coding stage, wherein the first video coding stage and the second video coding stage are implemented at least partly in parallel.

19. The method of claim 18, wherein each motion vector from the second portion of the second motion vectors is calculated based on a separate motion vector of a selected frame from the first subset of frames and a temporal distance between the selected frame and a particular frame associated with each motion vector.

20. The method of claim 18, wherein determining the first motion vectors comprises:
for a frame in the first subset of frames, comparing one or more blocks of the frame with a plurality of blocks in a reference frame from the sequence of frames;
determining a predictive block from the plurality of blocks based on respective pixel differences between the one or more blocks of the frame and each of the plurality of blocks in the reference frame; and comparing a first position of the one or more blocks of the frame with a second position of the predictive block associated with the reference frame.

21. The method of claim 18, wherein the second portion of the second motion vectors is predicted based on a temporal distance between one or more frames associated with the second portion of the second motion vectors and one or more reference frames associated with the one or more motion vectors from the first motion vectors stored in the memory.

22. The method of claim 18, further comprising:

determining a coding pattern for reconstructing the first subset of frames and the second subset of frames, the coding pattern defining an order for reconstructing frames and a respective reference frame for determining each of the first motion vectors and each of the second motion vectors; and reconstructing the first subset of frames and the second subset of frames according to the coding pattern.

23. The method of claim 22, wherein the coding pattern is based on at least one of frame dependencies or a temporal distance between each frame in the sequence of frames.

24. The method of claim 23, wherein the frame dependencies comprise a requirement that, for each frame in the sequence of frames, a reference frame used to reconstruct each frame has completed being reconstructed.

25. The method of claim 18, further comprising:

at each interval associated with the first frame rate, determining a motion vector of a frame from the first subset of frames, determining respective motion vectors of a number of different frames from the second subset of frames, and reconstructing the number of different frames from the second subset of frames.

26. The method of claim 18, wherein reconstructing the first subset of frames and the second subset of frames comprises applying to the first subset of frames and the second subset of frames at least one of motion compensation, one or more transforms and coefficient quantizations, or one or more deblocking filters.

27. The method of claim 18, wherein the first video coding stage and the second video coding stage are implemented via a dedicated hardware processing pipe.

28. The method of claim 27, further comprising: separately implementing, via one or more additional dedicated hardware processing pipes, the first video coding stage and the second video coding stage to one or more respective sequences of frames.

29. The method of claim 18, wherein the first motion vectors are determined using a motion estimation algorithm and the second motion vectors are determined using an interpolation algorithm, the motion estimation algorithm being different than the interpolation algorithm.

30. The method of claim 18, further comprising:

generating an encoded video bitstream, the encoded video bitstream including the sequence of frames; and transmitting the encoded video bitstream.

31. A non-transitory computer-readable medium having stored thereon instructions which, when executed by one or more processors, cause the one or more processors to:

determine, during a first video coding stage implemented at a first frame rate, first motion vectors for a first subset of frames in a sequence of frames;

output the first motion vectors for storage in a memory for use in a second video coding stage;

determine, during a second video coding stage implemented at a second frame rate that is higher than the first frame rate, second motion vectors for a second subset of frames in the sequence of frames, wherein the second subset of frames includes first frames that were processed during the first video coding stage and second frames that were not processed during the first video coding stage, wherein a first portion of the second motion vectors determined for the first frames during the second video coding stage includes the first motion vectors stored in the memory and a second portion of the second motion vectors determined for the second frames during the second video coding stage is predicted using one or more motion vectors from the first motion vectors stored in the memory, and wherein the second subset of frames includes a greater number of frames than the first subset of frames based on the second frame rate being higher than the first frame rate;

reconstruct, during the second video coding stage at the second frame rate, the first subset of frames using the first motion vectors determined during the first video coding stage; and reconstruct, during the second video coding stage at the second frame rate, the second subset of frames using the second motion vectors determined during the second video coding stage, wherein the first video coding stage and the second video coding stage are implemented at least partly in parallel.

32. The method of claim 25, wherein the motion vector of the frame comprises at least one of the first motion vectors, and wherein the number of different frames is based on the second frame rate associated with the second video coding stage.

* * * * *